Jan. 5, 1932. R. G. COATES 1,839,833
OPERATING MECHANISM FOR MOTOR CAR CLUTCHES
Original Filed April 9, 1928
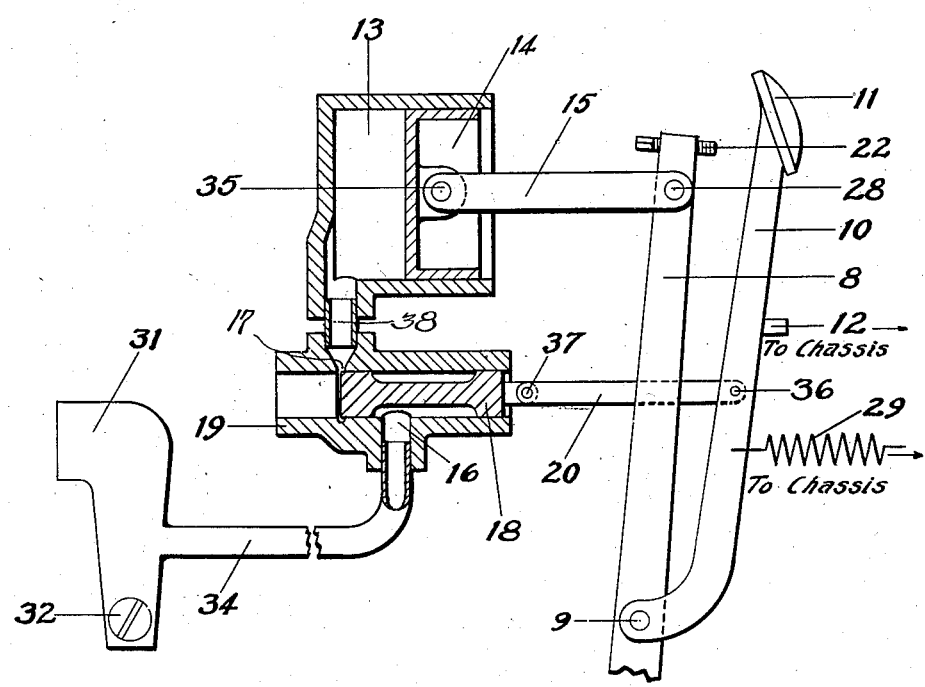
Inventor
Ray G. Coates Patented Jan. 5, 1932

1,839,833

UNITED STATES PATENT OFFICE

RAY G. COATES, OF PASADENA, CALIFORNIA

OPERATING MECHANISM FOR MOTOR CAR CLUTCHES

Original application filed April 9, 1928, Serial No. 268,631. Divided and this application filed September 30, 1930. Serial No. 485,460.

My invention relates to gas engine clutch operating mechanism for motor cars in which a spring is used to close the clutch which is opened by pressure on a pedal which overcomes the stress of the spring. If the open condition of the clutch is more than momentary the effort required to keep the clutch spring stressed becomes tiring.

An object of my invention is to render less laborious the effort required to open the clutch.

A second object is to make the effort of holding the clutch open so small that it may be held open indefinitely with ease.

A third object is to so arrange the mechanism that the clutch is either open or closed and thus reduce the wear due to too much slipping.

A fourth object is to obtain the above characteristics without interfering with the operation of the clutch by the foot, in the usual manner, if desired.

I accomplish the above results by using auxiliary power to assist the driver in his effort to open the clutch, and to hold it open.

It is possible to carry out my invention in many ways. The design herewith shown is diagrammatic and illustrates one way of applying my invention yet I contemplate applying it to any motor car clutch to which it may be applicable and do not limit myself to the particular construction illustrated.

This application results from a division declared in the case of my application for Letters Patent for operating mechanism for clutches filed April 9th, 1928, Serial Number 268,631, and the drawings in this application are parts of the drawings of the original application.

In applying power to operate motor car clutches it is usual to so arrange matters that the clutch opens in proportion to the stroke of the pedal. This requires the pedal to make a full stroke in order to fully open the clutch. This complete long stroke every time the clutch is opened causes unnecessary work. Again it is undesirable to open the clutch simultaneously with shutting off the fuel to the "idling point" as this prevents the engine from being quickly used as a brake. In my improvement changes in the fuel supply do not affect the clutch opening mechanism, therefore the clutch will remain closed until it is intentionally opened and the engine may be used as a brake without special provision.

In the drawings a clutch controlling member, here shown as a lever, 8, is carried by a fulcrum, 9, so that movements of the lever 8 in one direction will cause the clutch to open while movements of the lever in the opposite direction are caused by reaction of the clutch spring. The fulcrum 9 is attached to either the engine body or to the chassis so that its position as regards the clutch is fixed. A connection to the mechanism of the clutch may be made either to the lever 8 itself or to the fulcrum 9, which, in this latter case, turns with the lever 8. Both of these forms of connection are now common in this art so no further illustration of this connection is deemed necessary.

Attached to the lever 8, by the pin 28, is a connecting rod 15. The other end of 15 is pinned, by the pin 35, to the piston 14 which closes the otherwise open end of the cylinder 13, which latter is suitably secured to the chassis. The piston 14 moves in the cylinder 13 and normally is positioned as shown in Figure 1. The cylinder 13 is connected by the conduit 38 to the part 17 of the valve body 19. This latter also carries a port, 16, leading by the conduit 34 to the conventionally indicated intake manifold 31 with its conventional throttle valve 32. A valve, 18, covers the port 16 and at no time is this valve to connect port 16 to the atmosphere. A pedal lever, 10, carrying a pedal, 11, at one end is journaled at its other end on the fulcrum 9. A stop, 12, is fixed to the chassis so as to limit the movement towards the right of the pedal 10. The spring, 29, is connected to the chassis so that its reaction will insure the return of the lever 10 to the stop 12 when pressure is removed from the pedal 11. This is the normal position of the lever 10.

Connected to the lever 10 between the fulcrum 9 and the pedal 11, by the pin 36 is a connecting rod 20. The other end of 20 is connected to the valve 18 by the pin 37. When the pedal lever 10 moves to the left the valve 18 will also move to the left and will ultimately connect ports 16 and 17 and thus open communication, through the conduit 34, between the cylinder 13 and the intake manifold 31. The valve 18 requires but a short stroke to open this communication but, for reasons given later, the valve body 19 should be long enough and the valve itself should be of the proper dimensions to permit the valve to move a considerable farther distance to the left without any change in the communication between the cylinder 13 and the intake manifold 31. The pedal lever 10 is to be so placed that when the valve 18 has connected the cylinder 13 to the intake manifold 31 the lever 10 comes in contact with the lever 8. In order to make this contact of the lever 10 with the lever 8 at the moment the valve 18 has reached the full open phase the screw 22 may be used as a contact point. By adjusting the screw 22 the lever 10 may be brought in contact with lever 8 just as the valve 18 becomes fully opened. In this condition, the engine being assumed to be running, the piston 14 will move to the left and, through the connecting rod 15, will carry the lever 8 with it, thereby opening the clutch. In order to fully open the clutch it is not necessary for the pedal to move any farther to the left than enough to open the valve 18. This is a quite small fraction of the total stroke of the usual clutch pedal to accomplish this same result. Further the work of stressing spring 29 is very much less than that of overcoming the stress on the clutch spring.

If the engine is not running the pedal 10 may be pressed still farther to the left and thus make a contact with the lever 8 and push it before it and thus open the clutch. In this case the valve 18 will move farther to the left than in the normal valve stroke, which is the reason for the extra length of the valve body and valve previously mentioned.

The valve 18 opens by pressure on the pedal 11 and closes by the release of this pressure. The opening movement of the clutch controlling member has no effect to close the valve at any stage of the valve stroke, therefore when the valve has opened the piston will make a full stroke provided the pedal lever has not moved in the meantime. Thus the clutch moves to either the open or closed phases without undesired slipping between the faces of the clutch. To prevent the clutch from "grabbing", when the clutch is closed, the valve 18 may permit only a small opening to the port 17, when the pedal 11 is released, thus allowing the atmospheric pressure to enter the cylinder as slowly as may be necessary to make a smooth start. This is shown at the left hand end of valve 18 where the port 17 is still largely covered by the valve although the pedal lever 10 is in released position against the stop 12. This does not affect the full opening of the port 17 when pressure is applied to the pedal lever 10.

When pressure is removed from the pedal 11 the lever 10 returns to the stop 12 through the reaction of the spring 29. This moves the valve 18 back so as to cover only the port 16 and port 17 is open to the atmosphere through the end of the valve chamber 19. The clutch spring then moves the lever 8 back to its normal position, which act simultaneously carries the connection 15 and piston 14 with it and the parts are then in the normal position of "clutch closed". It will be seen that the clutch may be held open indefinitely against the heavy resistance of the clutch spring since the only resistance to be overcome is the small resistance of the spring 29.

I claim:

The combination with an intake manifold of a motor car motor, a throttle, and a clutch controlling member of a spring closed clutch, of a piston, a means for operatively connecting said piston to said clutch controlling member, a cylinder in which said piston is movable having a closed end in advance of the piston, a suction conduit leading from said intake manifold to the closed end of said cylinder, a pedal lever adapted to move said clutch controlling member after a normal short stroke without moving said member during said normal short stroke, a yielding means, not actuated by fluid pressure, adapted to maintain said pedal lever in released position, a valve in said suction conduit connected, by an inelastic operable connection, to and controlled solely by said pedal lever and adapted to admit atmospheric pressure to said cylinder and to cut off communication with said intake manifold when said pedal lever is released and to cut off atmospheric pressure from said cylinder and open communication with said intake manifold to permit a full stroke to said piston when said pedal lever is stressed and moved to the extent of said normal short stroke, the communication of said cylinder with the atmosphere and with the said intake manifold being unchanged by movements of said pedal lever beyond the limits of said normal short stroke or by movements of said piston or by variations in the pressure in said cylinder.

RAY G. COATES.